United States Patent [19]

Greenberg

[11] 4,399,563
[45] Aug. 16, 1983

[54] FIBER OPTICS HIGH SPEED MODEM

[75] Inventor: Joseph H. Greenberg, Phoenix, Ariz.

[73] Assignee: Honeywell Information Systems Inc., Phoenix, Ariz.

[21] Appl. No.: 220,868

[22] Filed: Dec. 29, 1980

Related U.S. Application Data

[63] Continuation of Ser. No. 897,458, Apr. 18, 1978, abandoned.

[51] Int. Cl.³ ............................................. H04B 9/00
[52] U.S. Cl. .................................. 455/607; 350/96.16; 455/612
[58] Field of Search ............... 455/601, 603, 607, 610, 455/612; 350/96.13, 96.14, 96.16

[56] References Cited

U.S. PATENT DOCUMENTS

| | | | |
|---|---|---|---|
| 3,566,127 | 2/1971 | Hafner | 455/612 |
| 3,803,405 | 4/1974 | Ohnsorge | 455/612 |
| 4,027,153 | 5/1977 | Kach | 455/607 |
| 4,062,043 | 12/1977 | Zeidler | 455/612 |
| 4,068,952 | 1/1978 | Erbert | 350/96.16 |
| 4,092,059 | 5/1978 | Hawkes | 350/96.16 |
| 4,107,518 | 8/1978 | McMahon | 455/601 |

*Primary Examiner*—Howard Britton
*Attorney, Agent, or Firm*—W. W. Holloway, Jr.; L. J. Marhoefer

[57] ABSTRACT

This relates to a fiber optics communication link, wherein a single optical fiber carries data bi-directionally between two computers. The first computer is coupled by means of control logic to a first transmitter and a first receiver. The first transmitter and receiver are in turn coupled to a single optical fiber by means of a Y-coupler. A second computer is similarly coupled via control logic to a second transmitter and second receiver, which is in turn coupled to the single optical fiber by means of a second Y-coupler. To minimize problems due to reflections, each receiver is disabled when its corresponding transmitter is transmitting data.

13 Claims, 10 Drawing Figures

FIBER OPTICS HIGH SPEED MODEM

This is a continuation of application Ser. No. 897,458, filed Apr. 18, 1978, now abandoned.

BACKGROUND OF THE INVENTION

1. The Field of the Invention

This invention relates generally to fiber optic data transmission systems, and more particularly, to a bi-directional fiber optic computer link.

2. Description of the Prior Art

High speed modems such as the Astro-Jet-400 Series Data Communication Systems manufactured by Astrocom Corporation and the 303 Type Wideband Data Stations manufactured by American Telephone and Telegraph Company are well known. These prior art systems employ twisted pair and coaxial cable as a transmission medium and, as a result, have several disadvantages.

One such disadvantage resides in the susceptibility of electrical lines to electromagnetic interference which causes random burst errors to appear on the line. Thus, in order to assure data integrity, complex error correcting and detecting techniques and retransmission techniques are employed. This requirement greatly increases the cost of the system and decreases the transmission data rate.

A further disadvantage results from the requirement that a return line be provided. Since the signal is referenced to a particular ground potential, problems arise due to ground potential shifts.

Additionally, complex logic is required to compensate for the different amounts of attenuation of the various frequencies being transmitted. Further, the use of coaxial cable results in cable congestion which is a serious drawback in environments which require dense packaging of processor units.

With the vast improvements in optical fiber technology and associated source and detector components, the use of fiber optics in computing systems is very much a reality. Many of the problems associated with twisted pair and coaxial cable, briefly mentioned above, are substantially reduced or eliminated. For example, transmission through optical fibers is performed optically in accordance with principles governing dielectric waveguide propagation. Such transmission is not susceptible to electromagnetic interference. Thus, the need for elaborate error detecting and correcting capabilities is no longer necessary. Further, there need be no concern over ground potential shifts, since the two units being interconnected are completely independent electrically.

The problems associated with the attenuation along electrical conductors is substantially reduced in a fiber optic signal, since the actual signal is modulated onto light. The frequency of the signal is such a small percentage of the frequency of the light that the optical transmission characteristics have virtually no effect on the information content. In contrast, a signal transmitted over twisted pair is transmitted with no high frequency carrier and thus the effects of the transmission media are felt to a much greater extent.

Finally, there are other advantages associated with fiber optics which make it a viable form of data communication. First, there is the obvious advantage of reduced size which is important in situations where dense packaging requirements exist. Second, fiber optics offer wider bandwidth and lower attenuations. Third, much higher data rates are possible using fiber optics, and transmission can be accomplished over much longer lengths, e.g., one kilometer. Finally, problems such as signal ringing, line capacitance, and dangerous short circuiting are substantially reduced.

SUMMARY OF THE INVENTION

It is the object of the present invention to provide a high speed fiber optic link between communicating computers.

It is a further object of the present invention that data be transmitted bi-directionally over a single fiber coupling two computers. This is accomplished by having a single fiber coupled to both the transmitter and receiver at each end of the link.

It is a further object of the invention that problems due to reflections of the transmitted signal back into the receiver at the sending end be substantially reduced by disabling the receiver during transmissions.

According to a broad aspect of the invention there is provided apparatus for transmitting and receiving data, comprising: first means for encoding data to be transmitted; second means for decoding received data; an optical fiber having first and second ends for carrying transmitted and received data; and third means for coupling the first end of said optical fiber to said first and second means.

The above and other objects of the present invention will be more clearly understood from the following detailed description taken in conjunction with the accompanying drawings, in which:

DESCRIPTION OF THE PREFERRED EMBODIMENT

The inventive fiber optics link is intended as a direct replacement for the standard high speed modem. The data rate is 59 Kbits in each direction.

Figure 1:
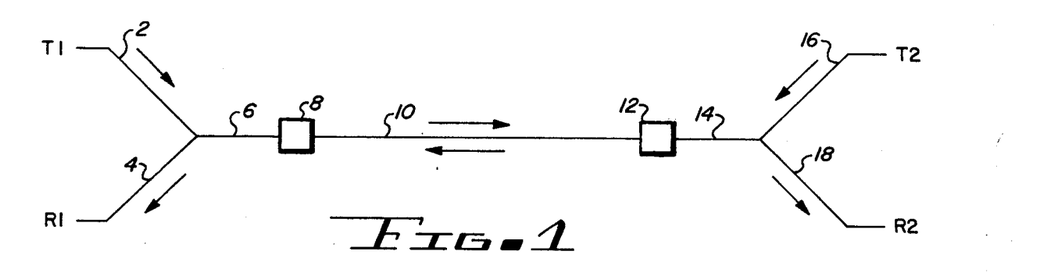
FIG. 1 is a functional diagram showing a communication link employing a single fiber.

Referring to FIG. 1, there is illustrated the information transmission paths in accordance with the present invention. At one end, a transmitter output T1 is coupled to a receiver input R2 by means of branches 2 and 6 of a first optical Y-coupler, connector 8, a single optic fiber 10, connector 12 and branches 14 and 18 of a second optical Y-coupler. A second transmitter output T2 is coupled to the input of a second receiver R1 through branches 14 and 16 of the second optical Y-coupler, connector 12, single optic fiber 10, connector 8 and branches 4 and 6 of the first Y-coupler. As is shown, the Y-couplers permit a single transmitting fiber 10 to be coupled to both the transmitter and receiver at each end of the link. As a transmitting source, there may be used an infrared diode of the type manufactured by Texas Instruments, e.g., a TIES35. The receiving element may comprise an avalanche photodiode also of a type manufactured by Texas Instruments, e.g., TIED69.

A problem introduced as a result of employing Y-couplers in order to achieve bi-directionality resides in the reflections of transmitted signals back into the photodiode receiver at the sending end of the link. To solve the problem, it is necessary that the receiver at the sending end of the link be disabled when its associated transmitter is on. However, it should be obvious that the receiver must again be enabled when a signal from the other end of the link is expected. This requires synchronization between the two ends of the link.

Figure 2:
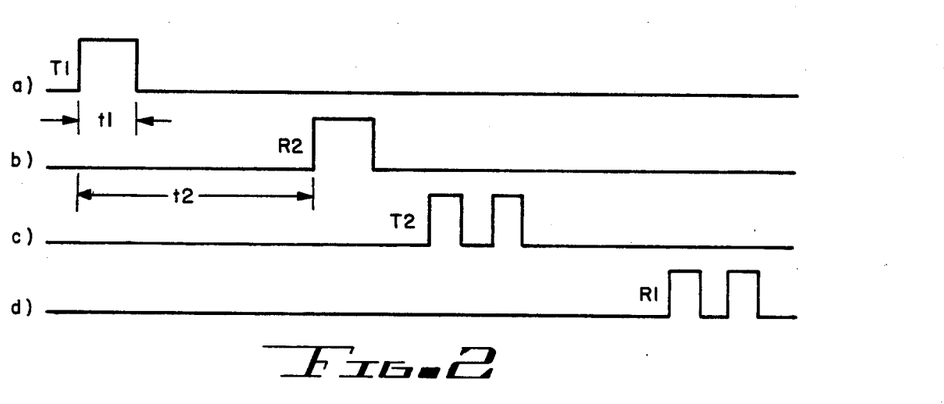
FIGS. 2a–2d are timing waveforms used in the explanation of the arrangement shown in FIG. 1.

FIG. 2 illustrates one approach for synchronizing the two modems. In FIG. 2a, there is shown a signal T1 corresponding to a logic "0." The signal has a width of t1, typically 1 microsecond. Modem one (i.e., T1 and R1) determines the system timing by transmitting a data bit such as is shown in FIG. 2a every 16 microseconds. During this time, receiver R1 is disabled.

Some period of time later (t2) the pulse of FIG. 2a will be received at receiver R2. This is shown in FIG. 2b. The transmission delay t2 corresponds to the length of time it took the signal to reach the receiver at the other end of the link. For one kilometer of fiber, t2 is approximately 5 microseconds. When the signal is received at receiver R2, it is processed and a trigger is generated for triggering transmitter T2. When transmitter T2 is energized, receiver R2 must be disabled to avoid problems due to reflections as described above.

After disabling receiver R2, transmitter T2 encodes a signal which is to be transmitted through the link and received by receiver R1. FIG. 2c illustrates the transmitted output at T2 which in this case comprises two pulses having a predetermined width and separated by a predetermined period of time. This pulse pair corresponds to a logical "1." Typically, each pulse may be one-half microsecond in duration separated by a one-half microsecond period of time. It should be appreciated that this signal must be received by R1 before transmitter T1 is due to transmit again. If not, a subsequent transmission from T1 would cause the receiver R1 to be disabled, and the incoming data could be lost. The logical "1" received at R1 is shown in FIG. 2d as being received after the above described propagation delay.

It should at this time be appreciated that the scheme proposed is self-clocking so that a separate clock line is not required. The data bits thus far described have a constant duty cycle which is an important consideration in AC coupled receivers. Further, the low duty cycle of the encoding scheme allows the transmitting diodes to operate at greater power.

Figure 3:
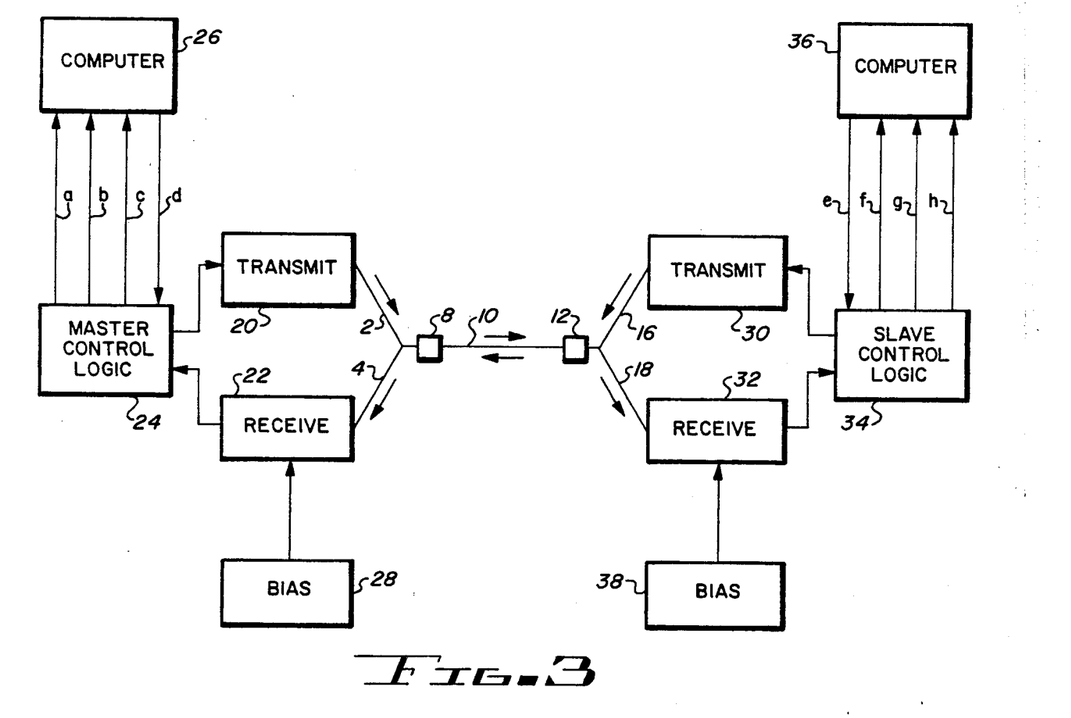
FIG. 3 is a functional block diagram of the inventive computer data link.

FIG. 3 is a more detailed block diagram of the bi-directional data link by means of which computers 26 and 36 can communicate. Computer 26 is coupled to master control logic 24. Master control logic 24 receives data to be transmitted from computer 26 on line d. Computer 26 receives from the master control logic 24 a transmit clock on line a, a received signal clock on the line b and the received data on line c. Similar signals, i.e., transmit clock, a received signal clock and received data are forwarded to computer 36 from slave control logic 34 over lines f, g, and h respectively. Data intended for transmission from computer 36 to computer 26 is applied to the slave control logic 34 on line e.

Coupled to master control logic 24 is a transmitter 20 for transmitting encoded data to the other end of the link and a receiver 22 for receiving data from the other end of the link. Data transmission is accomplished by means of a single optic fiber 10 as was described in connection with FIG. 1. Similarly, at the other end of the link, a transmitter 30 and a receiver 32 are coupled to the slave control logic 34. Biasing arrangements 28 and 38 are coupled to receivers 22 and 32 respectively.

Figures 4, 6:
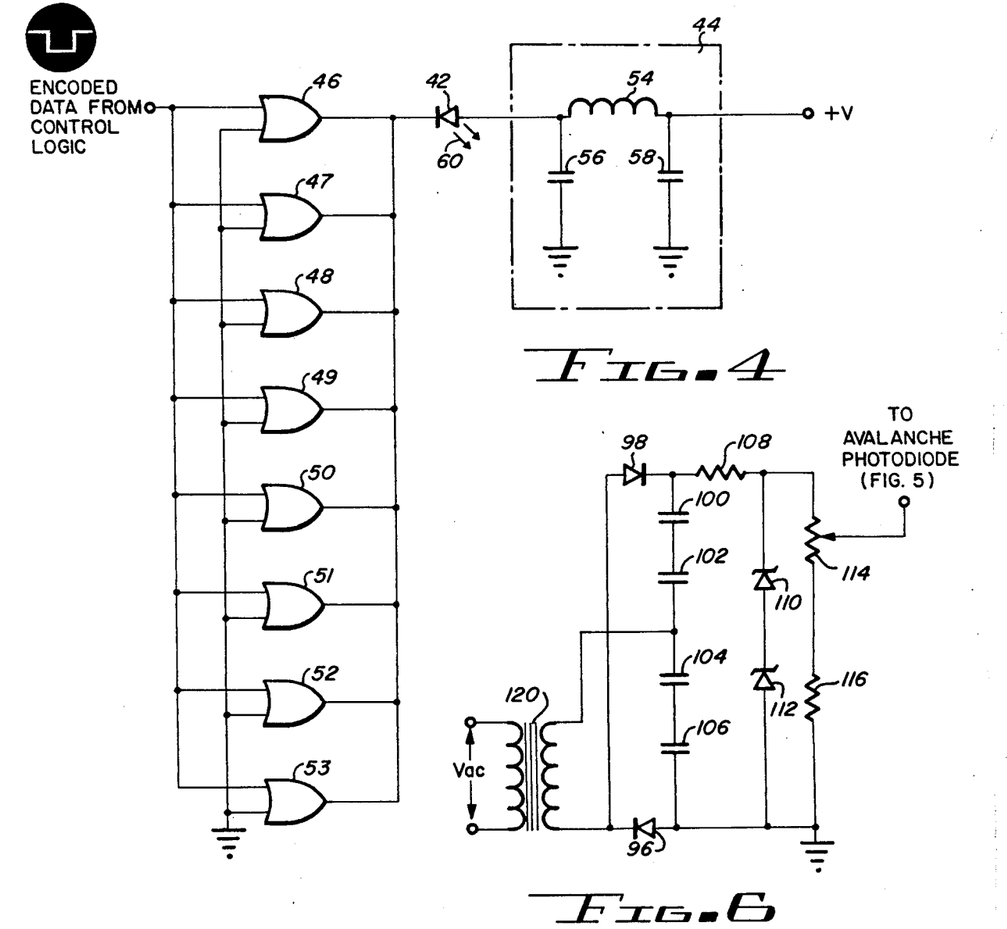
FIG. 4 is a detailed schematic diagram of the transmitters shown in FIG. 3.
FIG. 6 is a schematic diagram of the biasing unit associated with each receiver of FIG. 3.

The transmitters 20 and 30 of FIG. 3 are shown in more detail in FIG. 4. The encoded data from the control logic (master or slave) is applied to one input of a plurality of driver circuits 46-53. The other input of each of the driver circuits is coupled to ground. The outputs of the driver circuits are coupled together and connect to the cathode of infrared diode 42. The diode may comprise for example, a TIES35 infrared diode manufactured by Texas Instruments. The anode of the diode is coupled through filter 44 to a positive source of supply voltage, for example 5 volts. The filter comprises inductor 54 and capacitors 56 and 58 and prevents undue loading of the supply voltage. Infrared diode 42 generates an output when a low voltage (ground if +V=5 V) is applied to the inputs of the driver circuits. An optical output from diode 42 is shown by arrows 60.

Figure 5:
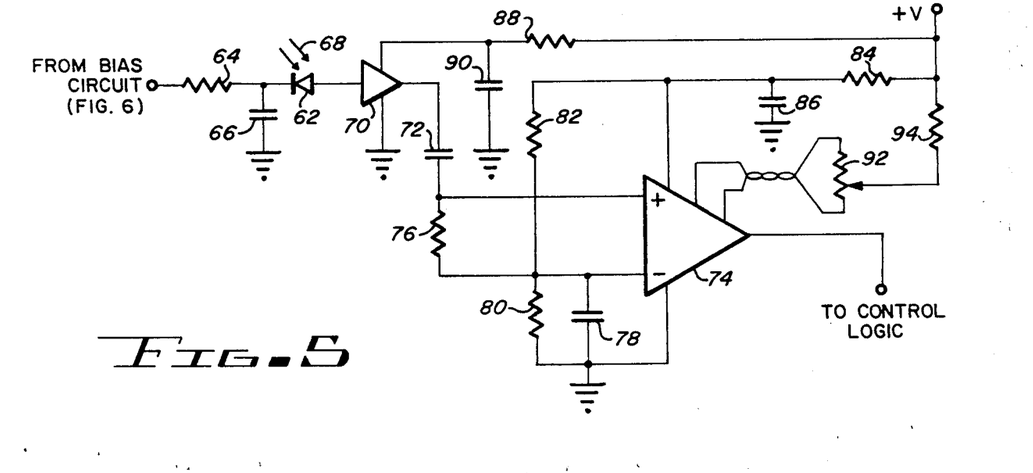
FIG. 5 is a schematic diagram of the receiver shown in FIG. 3.

The receivers 22 and 32 of FIG. 3 are shown in more detail in FIG. 5. An avalanche photodiode 62 is employed as an optical detector and has an internal gain which is a function of the applied reversed bias. This bias is applied through resistor 64 and capacitor 66. Optical energy transmitted by the infrared diode of FIG. 4 is shown as impinging on avalance photodiode 62 by arrows 68. A TIED69 avalanche photodiode manufactured by Texas Instruments may be employed.

The anode of photodiode 62 is coupled to the input of a preamplifier 70 (e.g., a TIEF152) which provides a first stage of amplification. Preamplifier 70 has an output which is AC coupled via capacitor 72 to a first input of comparator 74 (e.g., an LM311 comparator manufactured by National Semiconductor which provides a second stage of amplification. Preamplifier 70 also drives resistor 76 which is coupled to ground via capacitor 78.

The negative input of comparator 74 is maintained at a constant DC level to permit the device to operate in an active region. The desired DC level is derived by a voltage divider comprising resistors 80 and 82 having a junction coupled to the minus input of comparator 74. Decoupling resistor and capacitor, 84 and 86 respectively, decouple comparator 74 from the positive supply voltage (V+). Similar decoupling elements (resistor 88 and capacitor 90) are employed between V+ and preamplifier 70.

The threshold at which comparator 74 switches is determined by potentiometer 92 coupled to V+ via resistor 94. Since the output of comparator 74 is open collector, a pull-up resistor is required. This pull-up resistor is located in the control logic so as not to provide a feedback path via the receiver supply.

Biasing units 28 and 38 of FIG. 3 are shown in more detail in FIG. 6. The avalanche photodiode 62 shown in FIG. 5 requires between 135 volts and 185 volts depending upon the desired gain and must be protected from excessive currents. The biasing arrangement employs the existing isolation winding on a five volt supply transformer 120 which has an input coupled to Vac. A voltage doubling circuit comprising diodes 96 and 98 and capacitors 100, 102, 104 and 106 gives rise to a DC voltage of 310 volts at the cathode of diode 98. This voltage is applied to ballast resistor 108 which is coupled to the equivalent of a 180 volt zener diode shown as zener diodes 110 and 112. This yields a regulated 180 volts which is applied to a voltage divider comprising a potentiometer 114 in series with resistor 116. The potentiometer output can be varied from approximately 135 volts to 180 volts which is then applied to the avalanche photodiode 62 via resistor 64 and capacitor 66 (FIG. 5).

Referring briefly again to FIG. 3, the master control logic 24 and slave control logic 34 supplies a clock having a frequency of approximately 59 kiloHertz. The input data to the modem from computers 26 and 36 is changed on the rising edge of this clock. At the receiving end of the link, the receiver rederives the data and the clock. Master control logic 24 and slave control logic 36 are nearly identical. The differences reside in what triggers the transmission of a data bit. Master control logic 24 determines the system timing and triggers transmitter 20 every 32 periods of Z (discussed in detail hereinbelow). Transmitter 30 is triggered by an end of message signal from receiver 32 via slave control logic 34. A typical cycle would be as follows. Transmitter 20 is triggered by the 32nd count of Z. After propagation delay, receiver 32 receives the signal. After processing the signal, receiver 32 triggers transmitter 30 via slave control logic 34. After a similar delay, receiver 22 receives the signal transmitted by transmitter 30 and the cycle is again repeated. It should be noted that the propagation delay must be such that receiver 22 receives the signal transmitted by transmitter 30 prior to retransmission by transmitter 20.

Figure 7:
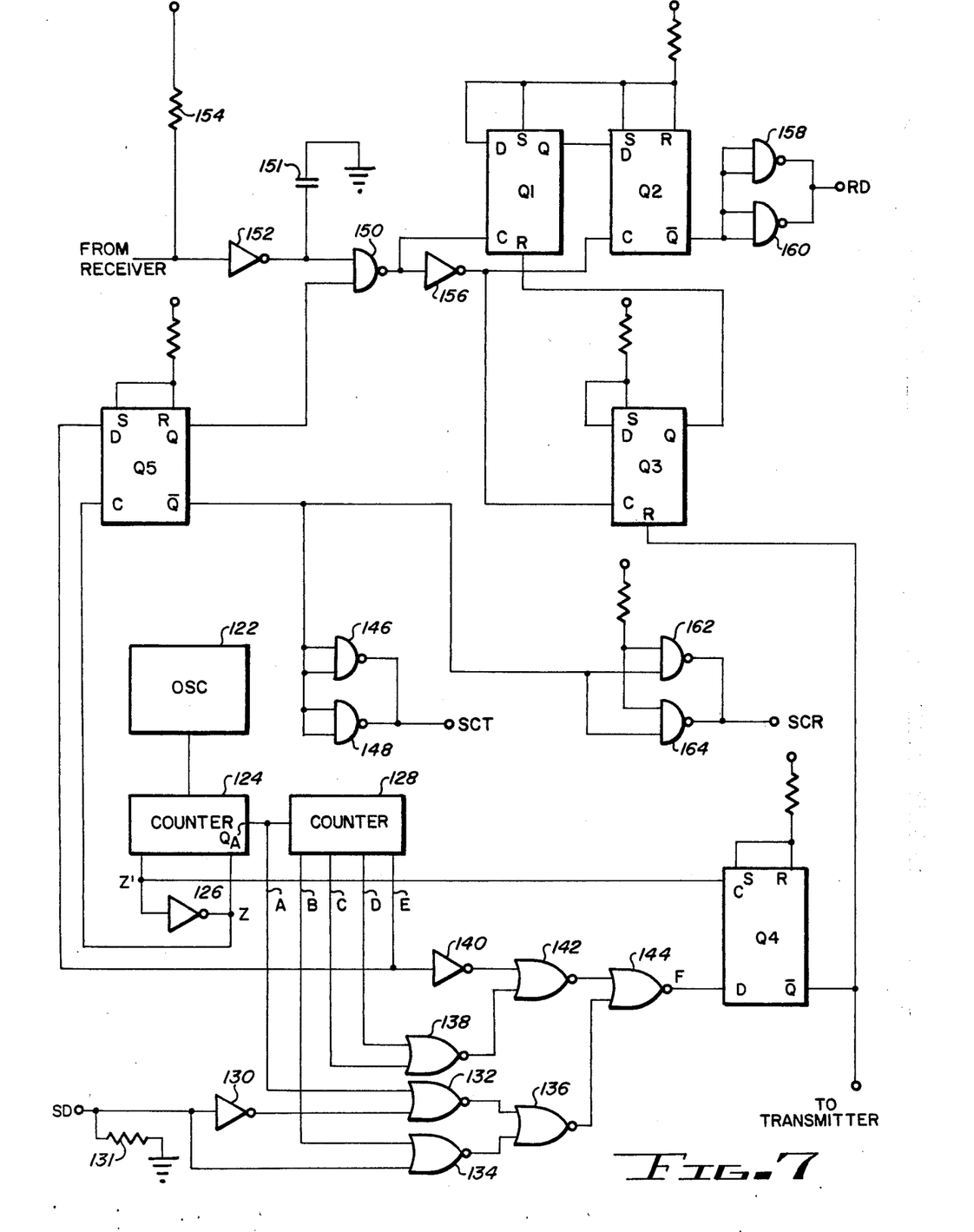
FIG. 7 is a detailed logic diagram of the master control logic of FIG. 3.

Referring to FIG. 7 which is a detailed logic diagram of the master control logic, a 3.8 MHz oscillator is provided having an output coupled to binary counter 124. An output of the counter is designated Z' and is inverted by inverter 126 to form Z. The frequency of Z is ½ that of the oscillator output. The waveform Z is then further divided by two five times in binary counters 124 and 128 to form waveforms A, B, C, D, and E as shown in FIG. 7. Waveforms Z, A, B, C, and D are shown in FIGS. 9a–9e respectively.

Data supplied by computer 26 (FIG. 3) denoted SD in FIG. 7 is applied to inverter 130 and one input of NOR gate 134. The output of inverter 130 is applied to one input of NOR gate 132, and the output of NOR gate 134 is applied to one input of NOR gate 136. The second input of NOR gate 132 has the waveform A coupled thereto while waveform B is coupled to the second input of NOR gate 134. The output of NOR gate 132 is coupled to a first input of NOR gate 136, and the output of NOR gate 134 is coupled to a second input of NOR gate 136. Waveforms C and D are applied to first and second inputs respectively of NOR gate 138 whose output is coupled to a first input of NOR gate 142. The waveform E is coupled through inverter 140 to a first input of NOR gate 142, the second input of which is coupled to the output of NOR gate 138. The outputs of NOR gates 142 and 136 are coupled to first and second inputs of NOR gate 144 the output of which corresponds to the function: $F=[((C+D)'+E')'+((B+SD)'+(A+SD')')']'$. This logic functions F is applied to the D input of flip-flop Q4 whose clock input is coupled to Z'. Q4 is clocked on the rising edge of Z'.

Figure 9:
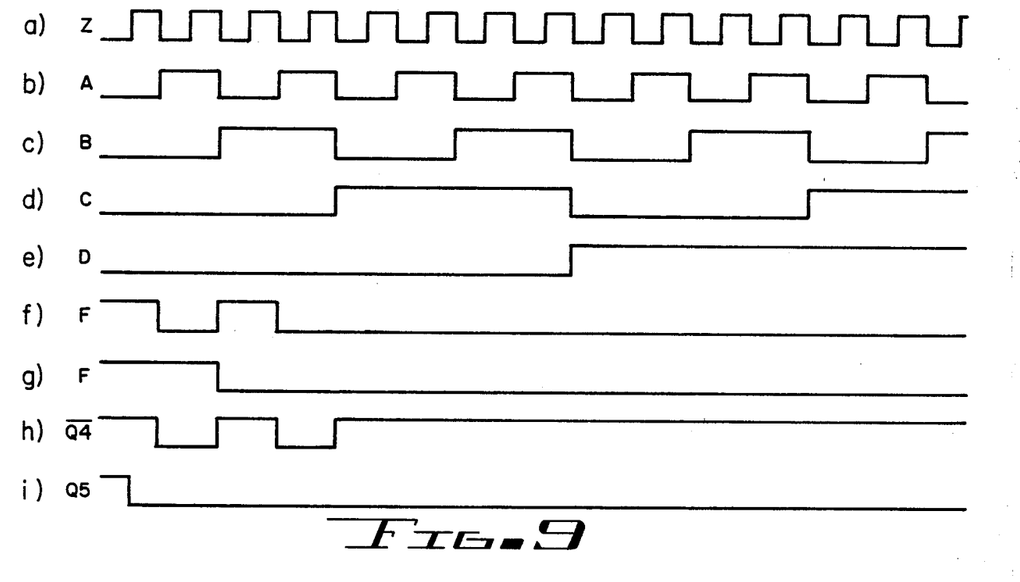
FIGS. 9a–9i are timing waveforms used in the explanation of the master control logic.

Data is encoded as follows. Two pulses of the duration of the period Z separated by the period Z denote a logical "1." One pulse of twice the period of Z denotes a logical "0." Waveforms corresponding to a logical "1" and a logical "0" are shown in FIGS. 9f and 9g and are produced in accordance with the above Boolean equation.

A logical "1" or "0" will be produced at F every 32 periods of Z. The output of Q4 reflects the data at F delayed by one period of Z. For a logical "1," this is shown in FIG. 9h.

A clock informing the computer that data may be changed is derived from waveform E which is strobed into flip-flop Q5 by the rising edge of Z. Note that this is the opposite edge of Z as was used to strobe F into Q4. The $\bar{Q}$ output of Q5 is applied to driver NAND gates 146 and 148 to derive the clock which is denoted SCT. It is safe to change data on the rising edge of SCT.

The output from the receiver is coupled to one input of NAND gate 150 via inverter 152. As stated previously, the output from the receiver is low when the photodiode receives radiation. Resistor 154 is the above referred to pull-up resistor for the open collector output of the receiver.

The Q output of flip-flop Q5 is applied to the other input of NAND gate 150. This has the effect of disabling the receiver when the transmitter is on. If the receiver were not so disabled, reflections of the transmitted signal would be received. Further, this eliminates the possibility of electronic cross-talk from the transmitter. The disabling signal from flip-flop Q5 is shown in FIG. 9i.

Figure 10:
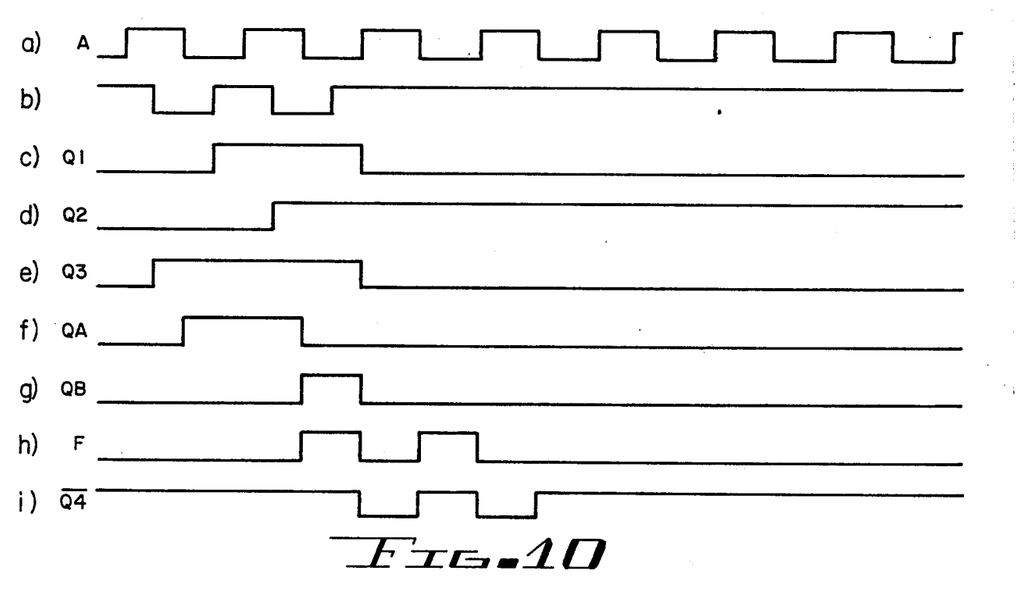
FIGS. 10a–10i are timing waveforms used in the explanation of the slave control logic.

The output of NAND gate 150 is coupled to the clock input of flip-flop Q1 and, after inversion in inverter 156, is applied to the clock inputs of flip-flops Q2 and Q3. Flip-flops Q1, Q2 and Q3 decode the received signal into a data and clock line. Referring to FIGS. 10a and 10b, there is shown the waveform A and a typical receiver output respectively. Flip-flops Q1, Q2 and Q3 are initially reset. It should be noted that the leading edge of the received pulses clock flip-flops Q2 and Q3, while the trailing edges of the received pulses clock flip-flop Q1. The first leading edge sets flip-flop Q3 as is shown in FIG. 10e. Flip-flop Q2 is set to the value of flip-flop Q1, which is at this time zero, resulting in no change to Q2. Since flip-flop Q3 is now set, the reset signal to flip-flop Q1 is removed. Flip-flop Q3 is reset when the $\bar{Q}$ output of flip-flop of Q4 goes low. This is shown in FIG. 10i.

Once flip-flop Q3 has been set, the first falling edge of the received signal sets flip-flop Q1. If the received signal consists of a single pulse, then Q2 remains at a logical "0." If the received signal consists of two pulses, then the second leading edge will set Q2, since flip-flop Q1 has already been set. The output of flip-flop Q2 represents the received data signal RD after buffering in NAND gates 158 and 160. The time required to bring flip-flop Q2 to its final state from the first leading edge of the received signal is two periods of Z. This corresponds to the time between the first and second leading edge if a double pulse were received. FIGS. 10c, 10d and 10e illustrate waveforms corresponding to the outputs of flip-flops Q1, Q2 and Q3.

A data received clock denoted SCR is produced by driver NAND gates 162 and 164 each of which have one of their inputs tied high and the other of their inputs coupled to the Q output of flip-flop Q5.

Figure 8:
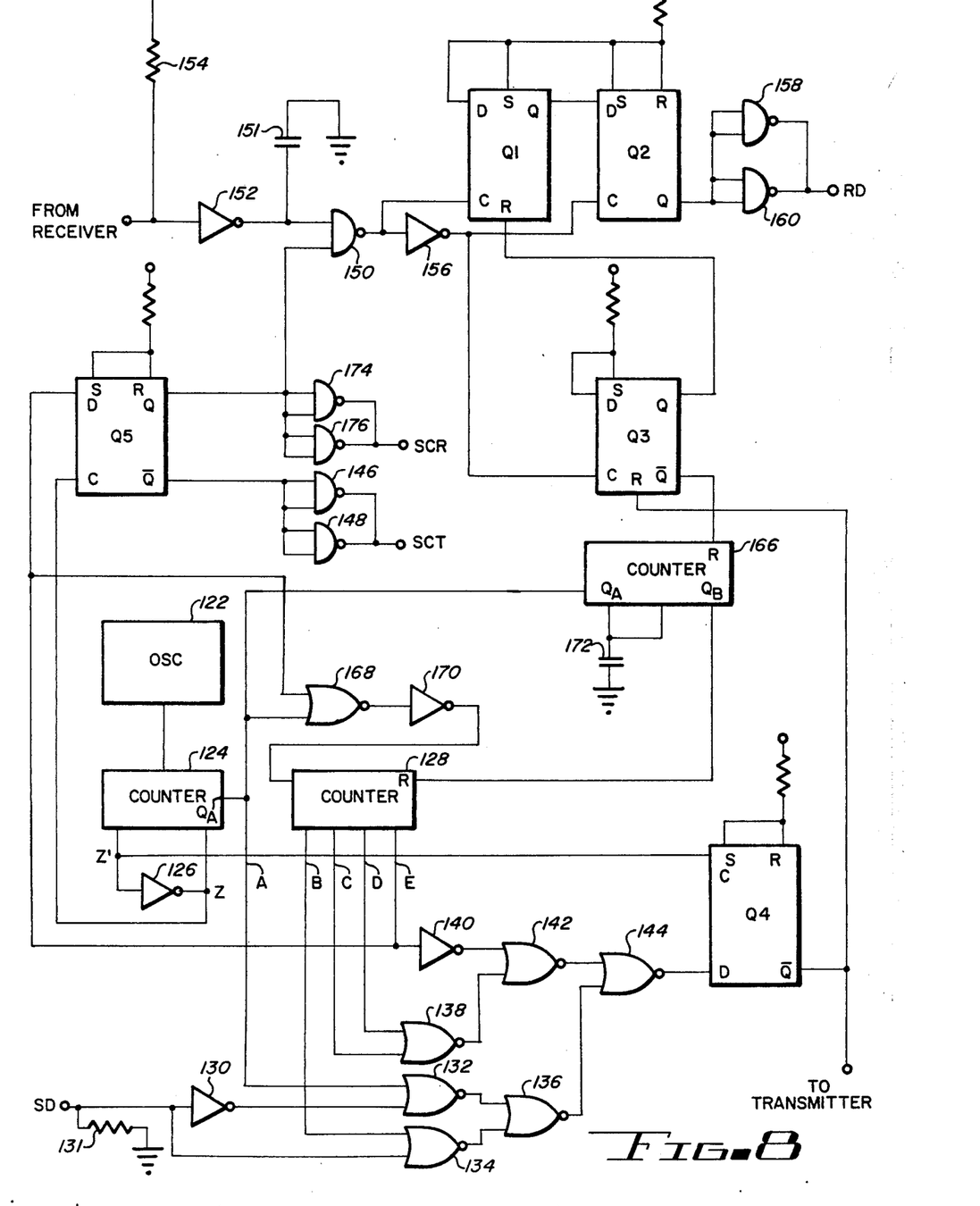
FIG. 8 is a detailed logic diagram of the slave control logic of FIG. 3.

FIG. 8 is a detailed logic diagram of the slave control logic. As stated previously, it is almost identical to that of the master control logic, and as a result similar elements are denoted by like numerals. Only the differences between the slave control logic and the master control logic will be discussed.

When flip-flop Q3 is set, a reset signal to counter 166 is removed as is the reset signal to flip-flop Q1. Counter 166 now begins counting the falling edges of waveform A. Since waveform A and the received signal are asynchronous, there is a period A of uncertainty as to when counter 166 will begin counting. If the reset is removed simultaneously with the falling edge of A, a spike will occur on the QA output of counter 166 which is filtered out by capacitor 172.

After two falling edges of waveform A, the divide by four output (QB) of counter 166 goes high resetting counter 128. The QA and QB outputs of counter 166 are shown in FIGS. 10f and 10g. At this time the waveform A is also low since it has just experienced a falling edge. Thus, counter 128 resets waveforms B, C, D and E. With all of these signals low, the functions F to flip-flop Q5 goes high as is shown in FIG. 10h. With the next rising edge of Z′, which corresponds to a rising edge of waveform A since waveform A was low, flip-flop Q4 is clocked high as shown in FIG. 10i, thus turning on the transmitter. It should be noted that half a period of Z earlier, flip-flop Q5 was clocked low disabling the receiver. The transmitter going high resets flip-flop Q3 which in turn resets flip-flop Q1 and resets counter 166.

The effect of this operation is to have the transmitter coupled to the slave control logic start 3–5 periods of Z after the leading edge of a received signal. The slave control logic employs some additional gating, i.e., NOR gate 168 and inverter 170 which disables counter 128 when waveform E is high. This prevents the transmitter coupled to the slave control logic from transmitting every 32 periods of Z. Instead, it only transmits when triggered by its associated receiver.

It should be noted that the clocks in both the master control logic and the slave control logic must be operating at the same rate since the received signal must be processed in the allocated 3–5 periods of Z.

It should be further noted that in the master control logic, the Q output of Q5 is employed for the receiver clock. Its falling edge corresponds to that time when the transmitter coupled to it begins operation. In the slave control logic, it is the Q output of flip-flop Q5 which is used to form the receiver clock via driver NAND gates 174 and 176. Its falling edge occurs 8 microseconds after the transmitter coupled to the slave control logic begins transmitting.

For the sake of completeness, the following is a list of the components employed in the above described embodiment and suitable values therefore.

| Item | Value | Item | Value |
| --- | --- | --- | --- |
| 56 | 220 μf | 82 | 4.7KΩ |
| 58 | 50 μf | 84 | 91Ω |
| 66 | 3300 pf | 88 | 91Ω |
| 72 | 1 μf | 92 | 3 KΩ |
| 78 | 1 μf | 94 | 100Ω |
| 86 | 2.2 μf | 108 | 316Ω |
| 90 | 1 μf | 114 | 150 KΩ |
| 100 | 8 μf | 116 | 422 KΩ |
| 102 | 8 μf | 154 | 1 KΩ |

-continued

| Item | Value | Item | Value |
| --- | --- | --- | --- |
| 104 | 8 μf | 131 | 110Ω |
| 106 | 8 μf | 54 | 47 uH |
| 151 | 2000 pf | 96 | RCA 44936 |
| 172 | 2000 pf | 98 | RCA 44936 |
| 64 | 10 KΩ | 110 | 1N4742 |
| 76 | 51Ω | 112 | 1N5279 |
| 80 | 910Ω | | |

While the invention has been described with reference to a specific embodiment thereof, it should be understood that changes in detail and design may be made without departing from the spirit and scope of the invention.

What is claimed is:

1. Apparatus for transmitting and receiving data, comprising:
   a. master means for generating a master timing signal timing at known intervals;
   b. first means connected to said master means for responding thereto by sending encoded data when said master timing signal is received;
   c. a second means for decoding received data;
   d. an optical fiber having a first end and a second end opposite to said first end thereof for transferring received data at said first end to said second end and at said second end to said first end;
   e. a third means for coupling said first end to said first and second means;
   f. a fourth means for decoding received data;
   g. a slave means responding to said fourth means decoding received data by generating a slave signal;
   h. a fifth means connected to said slave means for transmitting encoded data when said slave signal is received; and
   i. a sixth means for coupling said second end to said fourth and fifth means.

2. Apparatus according to claim 1 further including means for disabling said second means when data is being transmitted from said first means.

3. Apparatus as set forth in claim 1 wherein said third means includes a first optical Y-coupler having a first leg connected to said first means, a second leg coupled to said second means, and a third leg coupled to said first end.

4. Apparatus as set forth in claim 1 wherein said sixth means includes an optical Y-coupler having a first leg coupled to said fourth means, a second leg coupled to said fifth means, and a third leg coupled to said second end.

5. Apparatus according to claim 1, wherein said fifth means comprises:
   a second source of data to be transmitted;
   third logic means coupled to said second source for encoding data from said second source; and
   a second optical source coupled to said third logic means and to the first leg of said second optical Y-coupler for generating optical signals representing data from said second source.

6. Apparatus according to claim 5, wherein said second optical source is an infrared diode.

7. Apparatus according to claim 1, wherein said fourth means comprises:
   a second optical detector coupled to the second leg of said second optical Y-coupler for detecting optical signals on said fiber; and fourth logic means coupled to said second optical detector for decoding the optical signals detected by said second optical detector.

8. Apparatus according to claim 7, wherein said second optical detector comprises a photodiode.

9. Apparatus according to claim 1, wherein said first means comprises:
- a first source of data to be transmitted;
- first logic means coupled to said first source for encoding the data to be transmitted; and
- a first optical source coupled to said first logic means and to said first leg for generating optical signals representing data from said first source.

10. Apparatus according to claim 9, wherein said first optical source is an infrared diode.

11. Apparatus according to claim 9, wherein said first source is a computer.

12. Apparatus according to claim 9, wherein said second means comprises:
- a first optical detector coupled to said second leg for detecting received optical data on said fiber; and
- second logic means coupled to said first optical detector for decoding said received optical data.

13. Apparatus according to claim 12, wherein said first optical detector comprises a photodiode.

* * * * *